(12) United States Patent
Fornos Martinez et al.

(10) Patent No.: US 11,724,459 B2
(45) Date of Patent: Aug. 15, 2023

(54) CONFIGURING AN ADDITIVE MANUFACTURING SYSTEM

(71) Applicant: HEWLETT-PACKARD DEVELOPMENT COMPANY, L.P., Spring, TX (US)

(72) Inventors: Pol Fornos Martinez, Sant Cugat del Valles (ES); Emilio Sapena Masip, Sant Cugat del Valles (ES); Manuel Freire Garcia, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/605,382

(22) PCT Filed: Apr. 6, 2018

(86) PCT No.: PCT/US2018/026565
§ 371 (c)(1),
(2) Date: Oct. 15, 2019

(87) PCT Pub. No.: WO2019/194836
PCT Pub. Date: Oct. 10, 2019

(65) Prior Publication Data
US 2021/0122119 A1    Apr. 29, 2021

(51) Int. Cl.
*B29C 64/393*    (2017.01)
*B33Y 30/00*    (2015.01)
(Continued)

(52) U.S. Cl.
CPC .......... *B29C 64/393* (2017.08); *B29C 64/153* (2017.08); *B29C 64/295* (2017.08);
(Continued)

(58) Field of Classification Search
CPC ... B29C 64/393; B29C 64/153; B29C 64/295; B33Y 10/00; B33Y 30/00; B33Y 50/02
See application file for complete search history.

(56) References Cited

U.S. PATENT DOCUMENTS

| | | | |
|---|---|---|---|
| 2004/0026807 A1* | 2/2004 | Andersson | B33Y 10/00 264/40.1 |
| 2006/0032840 A1* | 2/2006 | Bagavath-Singh | B23K 26/32 219/121.64 |

(Continued)

FOREIGN PATENT DOCUMENTS

| | | |
|---|---|---|
| CN | 101917925 | 12/2010 |
| CN | 103258082 | 8/2013 |

(Continued)

*Primary Examiner* — Joseph S Del Sole
*Assistant Examiner* — John Robitaille
(74) *Attorney, Agent, or Firm* — Michael Dryja

(57) ABSTRACT

A method of configuring an additive manufacturing system. The method comprises configuring the additive manufacturing system with a first value of an operation parameter associated with the additive manufacturing system and, with the additive manufacturing system configured with the first value of the operation parameter, forming, in a build chamber, a first object The additive manufacturing system is subsequently configured with a second value of the operation parameter and, with the additive manufacturing system configured with the second value of the operation parameter, a second object is formed in the build chamber, subsequently to forming the first object. The method further includes receiving a signal indicative of which of the first value or the second value the operation parameter is to be configured with for subsequent operation of the additive manufacturing system.

18 Claims, 7 Drawing Sheets

(51) Int. Cl.
  *B33Y 50/02* (2015.01)
  *B29C 64/153* (2017.01)
  *B33Y 10/00* (2015.01)
  *B29C 64/295* (2017.01)

(52) U.S. Cl.
  CPC .............. *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2013/0064707 A1* | 3/2013 | Matsui | B29C 64/176 419/61 |
| 2013/0244040 A1* | 9/2013 | Oshima | B29C 64/165 264/109 |
| 2015/0045928 A1* | 2/2015 | Perez | B29C 48/2528 700/110 |
| 2015/0314532 A1 | 11/2015 | Gordon | |
| 2016/0332379 A1 | 11/2016 | Paternoster et al. | |
| 2017/0072646 A1 | 3/2017 | Sakura | |
| 2017/0075245 A1 | 3/2017 | Orrock et al. | |
| 2017/0129184 A1 | 5/2017 | Buller et al. | |
| 2017/0173874 A1 | 6/2017 | Batchelder et al. | |
| 2017/0282455 A1 | 10/2017 | DeFelice et al. | |
| 2017/0368756 A1 | 12/2017 | Ananos et al. | |
| 2018/0015663 A1 | 1/2018 | Zhao et al. | |

FOREIGN PATENT DOCUMENTS

| | | |
|---|---|---|
| CN | 105555444 | 5/2016 |
| CN | 106827514 | 6/2017 |
| CN | 106994781 | 8/2017 |
| CN | 107283846 | 10/2017 |
| EP | 3178588 A3 | 11/2017 |
| WO | WO2016010590 A1 | 1/2016 |
| WO | WO-2017200533 A1 | 11/2017 |
| WO | WO2017210490 A1 | 12/2017 |

\* cited by examiner

CONFIGURING AN ADDITIVE MANUFACTURING SYSTEM

BACKGROUND

Additive manufacturing systems, including those commonly referred to as "3D printers", provide a convenient way to produce three-dimensional objects. These systems may receive a definition of a three-dimensional object in the form of an object model. This object model is processed to instruct the system to produce the object. This may be performed by depositing a series of layers of a build material in a working area of the system. Chemical agents, referred to as "printing agents", may be selectively deposited onto each layer of the build material within the working area. In one case, the printing agents may include one or more of a fusing agent and a detailing agent, among others. Energy may be applied using a radiation source, such as an infrared lamp, to fuse areas of a layer where fusing agent has been deposited. The process may be repeated for further layers to build up a final object.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
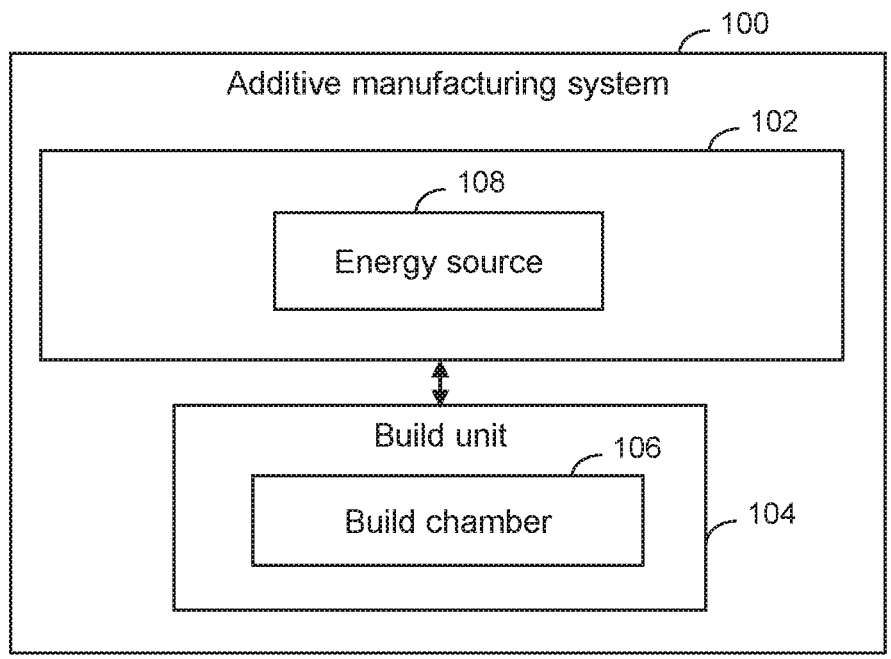
FIG. 1 is a schematic block diagram of an additive manufacturing system according to examples.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

In an example additive manufacturing system, sometimes referred to as a three-dimensional (3D) printing system or an additive manufacturing apparatus, build material is deposited in layers in a working area, which may be referred to as a build chamber. Chemical agents, referred to herein as "printing agents", are selectively deposited onto each layer within the build chamber. The printing agents may include, for example, a fusing agent and/or a detailing agent. The fusing agent may be selectively applied to a layer of the build material in areas where particles of the build material are to be fused together by subsequent application of energy, and the detailing agent may be selectively applied where the fusing action, or a temperature, is to be reduced or controlled. For example, a detailing agent may be applied to reduce fusing at an object boundary to produce a part with sharp and smooth edges. Following the application of printing agents, energy, for example thermal energy, is applied to the layer from an energy source of the additive manufacturing system. This causes build material on which the fusing agent has been applied to heat up above the melting temperature of the build material and to melt, coalesce and solidify. The process is then repeated for another layer, such that objects are built from a series of cross-sections. In other cases, one or other of the fusing agent and the detailing agent may be applied. For example, in some cases, a fusing agent may be selectively applied to regions of a layer of build material which are to be fused. In another example, a detailing agent may be selectively applied to regions of a layer of build material that are not to be fused.

It may be challenging to reliably manufacture objects repeatedly using different additive manufacturing systems. For example, different additive manufacturing systems of the same design may display mechanical differences that for example lead to small differences in, for example, airflow, which may cause differences in build chamber temperatures and in the quality of manufactured objects. Energy sources of different manufacturing systems, such as fusing lamps, may also display differences. There may also be environmental effects which affect the output from different additive manufacturing systems, such as an ambient humidity or temperature.

Furthermore, different users may have different needs of an additive manufacturing system. For example, the packing density, size of objects printed, shape of objects printed (such as whether objects are mainly hollow or solid objects), the internal structure of objects printed, the distance between printed objects and a border of the build chamber, or the vertical height of the build chamber may differ depending on the intended use of the additive manufacturing system by the user. These variables may also have an effect on the quality of the printed object.

In order to improve the repeatability for the manufacture of objects at different times, using different additive manufacturing systems or for different purposes (such as to print different objects), additive manufacturing systems may be individually configured. For example, the quality of a manufactured object or part typically depends on the amount of energy supplied by the energy source of the additive manufacturing system during fusing of the build material. If the energy source does not supply enough energy, the object may suffer from visible strips or channels, giving the appearance of wrinkled skin, which may be referred to as "elephant skin". Conversely, if the energy source supplies an excess of energy, a defect known as "thermal bleed" may occur, in which chunks of partially-melted build material are attached to an outer surface of the object.

Examples described herein allow an additive manufacturing system to be configured to determine an appropriate energy configuration or energy level of an energy source of the additive manufacturing system. For example, an appropriate energy configuration may be an energy configuration which reduces the frequency or severity of defects such as elephant skin or thermal bleed compared with other energy configurations.

In examples herein, an additive manufacturing system is used to form a first object in a build chamber and a second object in the build chamber, subsequently to the first object. The first object may be formed by fusing at least a portion of successive layers of a first plurality of layers of the first object by supplying energy of a first energy level from the energy source. The second object may be formed similarly to the first object but with the energy supplied from the energy source being of a second energy level, different from the first energy level. Hence, in examples such as this, two objects are formed using the same additive manufacturing system but with a different respective energy configuration.

A signal may be received indicative of which of the first or second energy level is to be used for subsequent operation of the additive manufacturing system. For example, the manufactured first and second objects may be compared to determine which of the first or second objects has a higher part quality or integrity or which is otherwise more similar to a desired structure. The energy level corresponding to the object with the higher quality, for example, may be selected as the energy level to be used subsequently. For example, if the first object is identified as being of a higher quality than the second object, the signal may be indicative that the first energy level is to be used for subsequent operation of the additive manufacturing system.

Thus, methods such as this allow an appropriate energy level to be determined for operation of the additive manufacturing system, which may improve the quality of manufactured objects compared with cases in which the energy supplied by the energy source is not configured in this way.

Following the completion of a build process, a manufactured object is typically cooled. Unsolidified build material may then be removed. However, cooling of a manufactured object may be a relatively time consuming process. For example, it may take around 4 hours to cool down an object. Hence, a process involving manufacturing, cooling and analyzing the first object (for example to assess a quality of the first object) before manufacturing the second object would be a relatively lengthy process.

In contrast, in examples described herein, the first and second objects may be printed as part of the same build process. In such cases, the second plurality of layers of the second object may be deposited, in a layer-by-layer fashion, on the first plurality of layers of the first object (although it is to be appreciated that there may be at least one layer between the first and second objects). By printing the first and second objects during the same build process, methods described herein may be performed more rapidly or more efficiently than a process involving manufacturing, cooling and analyzing the first object before manufacturing the second object.

FIG. 1 shows a simplified schematic diagram of an additive manufacturing system 100 according to an example. The additive manufacturing system 100 in this example includes a 3D printer 102 coupled to a build unit 104.

According to an example, a 3D print operation includes depositing a layer of a build material onto a build platform of the build unit 104. The build platform may be considered to correspond to or include a build chamber 106, which may be referred to as a build region or working area. In the example shown in FIG. 1, the build unit 104 is detachable from the 3D printer 102. In particular, the build unit 104 may be removed by an operator to perform a refill operation of the build unit 104. However, in other examples, the build unit 104 and the 3D printer 102 may be integral with each other.

The build unit 104 stores a supply of build material, for example, build powder. In one example a clean-up stage is performed on the build unit prior to a build powder fill operation. For example, in one case a clean-up stage includes a powder management station removing unused build material from the build unit and combining the unused build material with fresh build material for a further print operation. Unused build material may be recovered and recycled by a build powder management station, for instance, and mixed with virgin (or 'new') build material. Following a build powder fill operation, the operator may return the build unit 104 to the 3D printer 102 to perform further print operations.

The 3D printer 102 of FIG. 1 includes an energy source 108 to selectively fuse layers of the build material within the build chamber to form an object. This is shown in further detail in FIG. 2, which shows schematically an additive manufacturing system 200 according to examples. The additive manufacturing system 200 may be the same as or similar to the additive manufacturing system 100 of FIG. 1. Although the example of FIG. 2 is provided to understand the context of the examples described herein, those examples may be applied to a variety of additive manufacturing systems.

Figure 2:
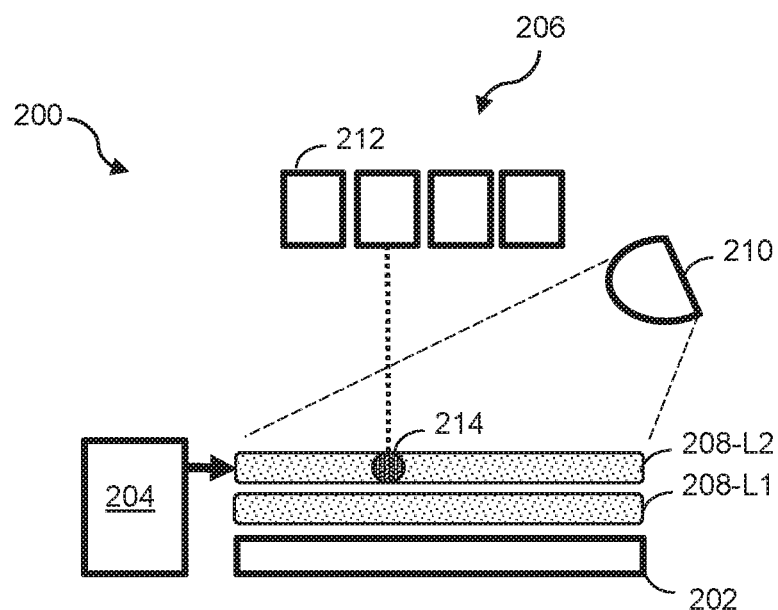
FIG. 2 shows schematically an additive manufacturing system according to examples.

In FIG. 2, the additive manufacturing system 200 includes a build platform 202, a build material supply mechanism 204 and a solidifying system 206. A three-dimensional volume within which the build material is supplied may be considered to correspond to a build chamber. The build chamber may therefore be bound by the build platform 202 and by a maximum height on the build platform 202 to which the build material may be deposited.

The build material supply mechanism 204 deposits a powdered build material on the build platform 202 in successive layers. Two layers are shown in FIG. 2: a first layer 208-L1 upon which a second layer 208-L2 has been formed by the build material supply mechanism 204. In certain cases, the build material supply mechanism 204 is arranged to move relative to the build platform 202 such that successive layers are formed on top of each other.

There are various different kinds of build materials from which a particular part or object may be built. The choice of build material may be made based on the desired properties of the part or object to be printed. In certain additive manufacturing systems, the build material may be changed between builds accordingly. For example, various plastic powder types can be used as the raw build material; for example, thermoplastics, such as polyimide (PA) 11, PA12, and thermoplastic polyurethane (TPU), etc. According to one example, a suitable build material may be PA12 build material commercially known as V1R10A "HP PA12" available from HP Inc. In other examples, ceramic or metal build materials, such as powders or powder-like materials, may be used. The build material may include short fibre build materials. For example, the powder may be formed from, or may include; short fibres that may, for example have been cut into short lengths from long strands or threads of material.

The additive manufacturing system 200 of FIG. 2 includes an energy source 210, which may be a radiation source or other source for supplying heat to the build chamber. For example, the energy source 210 may be a heating system. The energy source 210 may include a lamp, for example a short-wave incandescent or infra-red lamp. In other examples, the energy source 210 is another light source constructed to emit electromagnetic radiation across a range of wavelengths to heat the build material. For example, the energy source 210 may be a halogen lamp. In certain cases, the additive manufacturing system 200 may include additional energy sources or radiation sources to heat the build material. In certain cases, energy sources may have other uses. For example, the additive manufacturing system 200 may include lighting systems to illuminate the working area.

In certain examples, an infra-red "pre-heat" lamp may be used to heat the build material. The pre-heat lamp may be located above the build platform 202, for example so that it heats at least an upper surface of the build material. The pre-heat lamp may be controlled to heat the build material to a temperature just below a melting point of the build material. Another energy source may then be used during construction of a 3D object. For example, in one implementation a separate fusing lamp may be used. The fusing lamp may apply energy to cause fusing of build material on which a fusing agent has been applied. Examples described herein relate to the configuration of an energy source to fuse build material, such as a fusing lamp.

The energy source 210 may be moveable relative to the build platform 202. For example, in one implementation a fusing lamp may be carriage-mounted to scan across build material that is formed on the build platform 202. In some examples, a layer of build material may therefore be pre-heated by a static infra-red lamp and selectively fused with a scanning fusing lamp (although in other cases, the layer of the build material may be selectively fused by the fusing lamp without first being pre-heated). For example, a scanning fusing lamp may be controlled to scan the deposited build material and thereby substantially uniformly apply heat to the deposited build material. As explained in more detail below, heat absorption is highest in areas where a fusing agent has been deposited. In other examples, a pre-heat lamp may be moveable in relation to the build platform 202; in this case the pre-heat lamp may be selectively applied to areas of the upper surface of the build material so as to heat these areas. In certain cases, a pre-heat lamp may not be used, and a fusing lamp is used as the energy source to both pre-heat the build material and to cause selective fusing. Temperature stabilization of the build material layers may be achieved using at least one preheat lamp and/or using at least one fusing lamp.

In certain examples, including the example of FIG. 2, the solidifying system 206 includes a printing agent deposit mechanism 212. The printing agent deposit mechanism 212 for example includes at least one print head to deposit a fusing agent and a detailing agent. The fusing agent increases heating of the build material when energy is applied to the build material on which the fusing agent has been deposited (compared to portions of the build material on which no fusing agent is applied). The detailing agent reduces heating of the build material. For example, the printing agent deposit mechanism 212 may include an inkjet deposit mechanism for printing a plurality of printing agents onto layers 208 of powdered build material. In this case, an inkjet print head may be adapted to deposit one (or multiple) printing agents onto layers of powdered polymer build material that form the build material. In certain cases, each print head within the inkjet deposit mechanism may be arranged to deposit a particular printing agent upon defined areas within a plurality of successive build material layers.

A fusing agent (sometimes also referred to as a "coalescing agent") may increase heating of the build material by acting as an energy absorbing agent that causes build material on which it has been deposited to absorb more energy (e.g. from the energy source 210) than build material on which no fusing agent has been deposited. This may cause build material to heat up.

When constructing a 3D object, heat may be applied to the build material, for example from the energy source 210. As noted above, the fusing agent acts as an energy absorbing agent, and absorbs heat energy. Regions of build material to which the fusing agent is applied are thus heated to a greater degree than regions of build material to which the fusing agent is not applied. This heating may cause the regions of build material to which the fusing agent is applied to reach a temperature above the fusing temperature of the build material, and thereby fuse. In some examples, during a print operation for forming a 3D object, the build material may be maintained at a temperature slightly below the fusing temperature of the build material to reduce the amount of energy supplied by the energy source 210 and absorbed by the fusing agent to fuse the build material.

According to examples, a suitable fusing agent may be an ink-type formulation comprising carbon black, such as, for example, the fusing agent formulation commercially known as V1Q60Q "HP fusing agent" available from HP Inc. In one example such a fusing agent may additionally comprise an infra-red light absorber. In one example such a fusing agent may additionally comprise a near infra-red light absorber. In one example such a fusing agent may additionally comprise a visible light absorber. In one example such a fusing agent may additionally comprise a UV light absorber. Examples of inks comprising visible light enhancers are dye based colored ink and pigment based colored ink, such as inks commercially known as CE039A and CE042A available from HP Inc.

A detailing agent (sometimes also referred to as a "modifying agent") may act to modify the effect of a fusing agent and/or act directly to cool build material. When heating the build material, a detailing agent may thus be applied to reduce a heating effect of a previously applied fusing agent and/or to directly reduce the temperature of the build material. According to examples, a suitable detailing agent may be a formulation commercially known as V1Q61A "HP detailing agent" available from HP Inc. When constructing a 3D object, a detailing agent may be used to form sharp object edges by inhibiting a fusing agent outside of an object boundary and thus preventing solidification in exterior areas of a cross-section. During construction of an object, a detailing agent may also be used to reduce thermal bleed from a solidified area to a non-solidified area and to prevent fusing in certain "blank" or "empty" portions of an object such as internal cavities. At the end of production of an object, unsolidified build material may be removed to reveal the completed object. FIG. 2 shows a particular print head depositing a controlled amount of a printing agent onto an addressable area 214 of the second layer 208-L2 of powdered build material.

Figure 3:
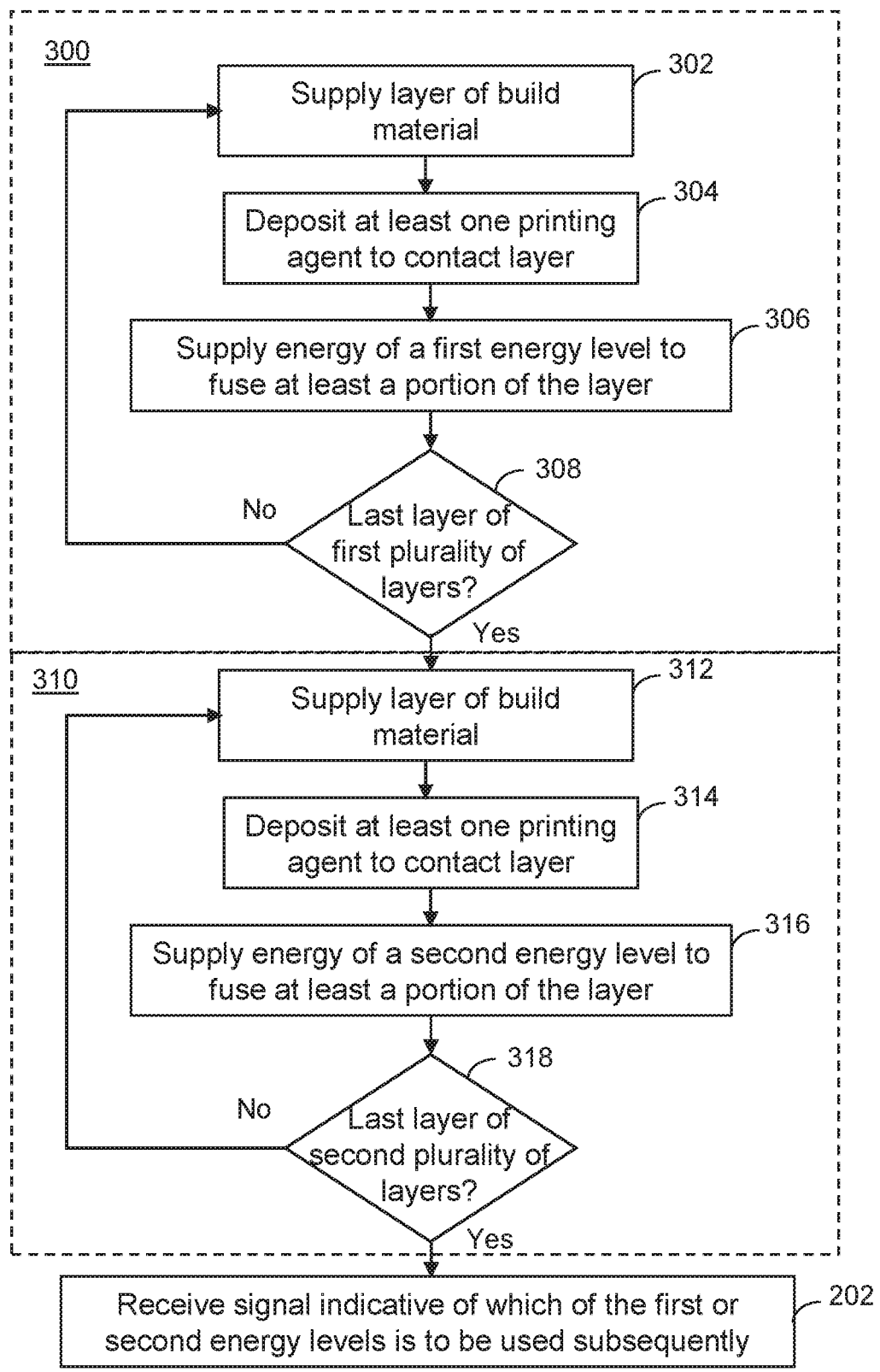
FIG. 3 is a flow diagram showing a method of configuring an additive manufacturing system according to examples.

FIG. 3 is a flow diagram showing a method of configuring an additive manufacturing system, such as the additive manufacturing systems 100, 200 of FIGS. 1 and 2. The method of FIG. 3 includes forming, in a build chamber, a first object comprising a first plurality of layers of a build material. This is shown schematically in FIG. 3 as the items of the method within the dashed box 300. The first object is formed in this example by supplying, at item 302, a layer of the first plurality of layers to the build chamber. At item 304, at least one printing agent is deposited to contact the layer of the first plurality of layers. At item 306, energy of a first level is supplied from an energy source of the additive manufacturing system to the layer of the first plurality of layers to fuse at least a portion of the layer of the first plurality of layers.

At item 308, it is determined whether the layer at least partially fused at item 306 is the last (or uppermost) layer of the first plurality of layers of the first object. If not, items 302, 304, 306 and 308 are performed again, as part of an iterative procedure, until all the layers of the first plurality of layers of the first object have been deposited and at least partially fused.

Once the first object has been formed, the method of FIG. 3 involves forming, in the build chamber, a second object comprising a second plurality of layers of the build material subsequent to the first plurality of layers, which is shown schematically as the items of the method within the dashed box 310. In this way, the second object is formed subsequently to the first object, within the same build chamber. For example, the second object may be formed on top of the first object, such that the first object is between the second object and the build platform. In this way, the second object may be formed subsequently to the first object within the same build process. In such cases, the first and second object may be considered to belong to the same build process where they are both formed in response to a single set of instructions or where the second object is formed on the first object without removing the first object from the build chamber or without cooling the first object.

It is, however, to be appreciated that references to the second object being formed subsequently to the first object are not intended to imply that the second object is necessarily formed immediately consecutively after the first object (with the last layer of the first plurality of layers in contact with the first layer of the second plurality of layers), although it may be. Instead, the second object may be considered to be formed subsequently to the first object if the second object is formed at a later point in time than the first object, with the second plurality of layers deposited, a layer at a time, subsequently to the formation of the first object, regardless of whether there are other components, layers or objects between the first object and the second object.

During a time period between forming the first object and the second object an energy level (which may be referred to as an energy configuration) of the energy source is adjusted. For example, while the energy source supplies energy of the first energy level during the formation of the first object, the energy source may be arranged to supply energy of a second energy level (different from the first energy level) during the formation of the second object. An energy level for example corresponds to an intensity of energy supplied by the energy source. Changing the energy level may change an irradiance received by the build chamber. The irradiance may be considered to be the radiant flux of energy received per unit area of a surface of or within the build chamber (such as a surface of a layer of build material within the build chamber).

For example, methods such as this may involve changing the energy configuration of the energy source in the vertical direction (which may be referred to as the Z-direction) with respect to the build platform 202. For example, the first energy level may be supplied in a first region in the Z-direction and the second energy level may be supplied in a second region in the Z-direction, which is for example above the first region.

Other than configuring the energy source with a different energy level than for manufacture of the first object, the second object may be formed similarly to the first object. For example, item 312 of FIG. 3 involves supplying a layer of the second plurality of layers to the build chamber. At item 314, at least one printing agent is deposited to contact the layer of the second plurality of layers. At item 316, energy of the second energy level is applied from the energy source to the layer of the second plurality of layers. At item 318 it is determined whether the layer at least partially fused at item 316 is the last (or uppermost) layer of the second plurality of layers of the second object. If not, items 312, 314, 316 and 318 are performed again, as part of an iterative procedure, until all the layers of the second plurality of layers of the second object have been deposited and at least partially fused.

After the manufacture of the first and second objects 300, 310, a signal indicative of which of the first energy level or the second energy level is to be used for subsequent operation of the additive manufacturing system. The first and second objects may be analyzed in order to generate the signal, as will be described further below with particular reference to FIGS. 7 and 8. The energy source may then be configured with whichever of the first or second energy levels the signal indicates. The additive manufacturing system may then be operated to manufacture further objects. In this way, the first and second objects may be considered test objects, which may be manufactured as part of the configuration process of FIG. 3.

Figure 4:
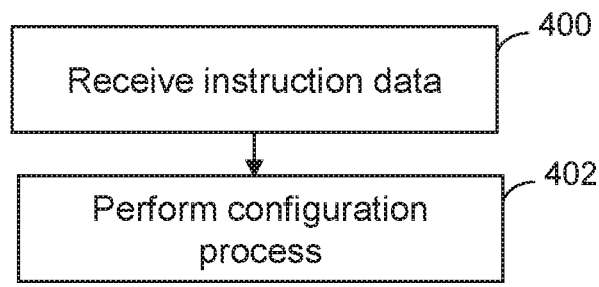
FIG. 4 is a flow diagram illustrating features of a method of configuring an additive manufacturing system according to examples.

As explained above, the first and second objects may be formed within the same build process. FIG. 4 shows such an example. At item 400 of FIG. 4, instruction data to instruct the additive manufacturing system to form the first object and to form the second object subsequently to forming the first object is received. At item 402 of FIG. 4, the configuration process is performed. The configuration process may for example be the same as or similar to the method described with reference to FIG. 3, Hence, in cases such as this, the instruction data may instruct the formation of both of the first and second objects before commencing the formation of either of the first and second objects. This may be more efficient than receiving separate instructions, at different points in time, instructing the formation of the first and second objects respectively.

The instruction data may be received in response to a change in state of the additive manufacturing system. For example, the additive manufacturing system may be configured with a startup routine which involves the configuration process. In such cases, the instruction data may be generated upon initialization or startup of the additive manufacturing system, to determine an energy level for the energy source during operation of the additive manufacturing system.

In other cases, the instruction data may be generated (and subsequently received by the additive manufacturing system, such as by a control system of the additive manufacturing system) based on a user input. For example, there may be a user interface configured to receive instructions from a user, such as a control panel. Via this user interface, the user may be able to select when the configuration process is to be performed. For example, the user may select to perform the configuration process upon startup of the additive manufacturing system (in examples in which the configuration process is not automatically initiated upon startup). Alternatively, the user may choose to instruct the additive manufacturing system to perform the configuration process prior to manufacturing a new object, such as an object with a different structure or size than previously-manufactured objects (as it is typically desirable to use different energy levels in the manufacture of objects with different structures). In yet further cases, the user may instruct the additive manufacturing system to perform the configuration process periodically or upon a change in an ambient environment of the additive manufacturing system, so that the energy level of the energy source remains appropriate over time.

Figure 5:
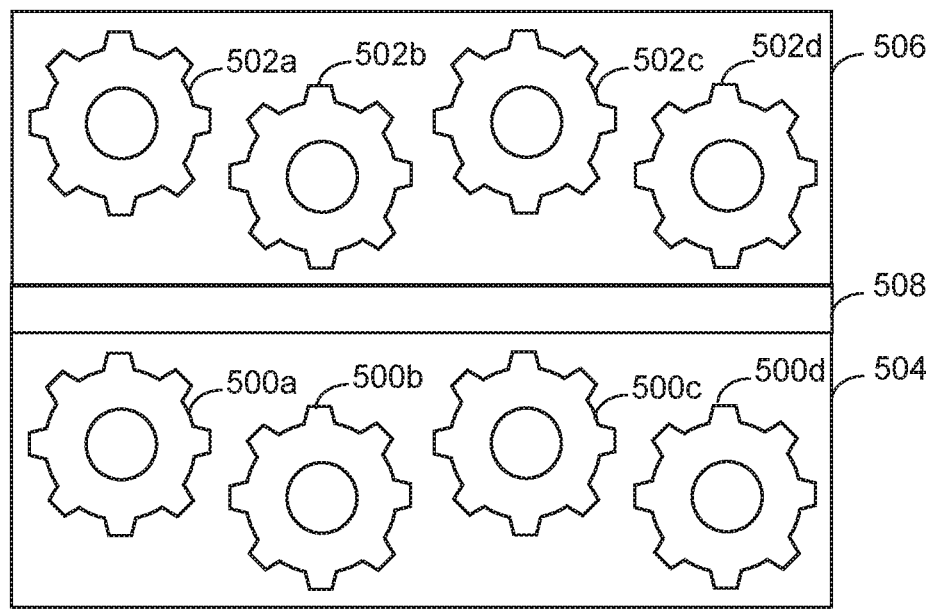
FIG. 5 shows schematically the formation of a first object and a second object according to examples.

FIG. 5 shows schematically the formation of a first object 500a and a second object 502a according to examples. In this example, the first object 500a is formed within a first build volume 504 and the second object is formed within a second build volume 506. The first build volume 504 in this example includes a plurality of objects 500b, 500c, 500d other than the first object 500a, which in this example are of the same structure as the first object 500a. The second build volume 506 also includes a plurality of objects 502b, 502c, 502d other than the second object 502a, which in this example are of the same structure as the second object 502a. This illustrates that the build volume (which is for example the volume within the build chamber) may be stratified into different layers, each associated with a different set of objects.

In the example of FIG. 5, there is a third plurality of layers 508 of the build material between the first build volume 504 and the second build volume 506. The third plurality of layers 508 for example form a transition region between the first object 500a and the second object 502a, allowing these two objects to be separated from each other. This may facilitate the analysis of the first and second objects 500a, 502a and aid in determining which of the first or second energy levels is to be used for subsequent operation of the additive manufacturing system.

In such cases, a configuration process, such as that of FIG. 3 or FIG. 4 may include supplying the third plurality of layers 508 of the build material to the build chamber, after forming the first object 500a and before forming the second object 502a, such that, after forming the first object 500a and the second object 502a, the third plurality of layers 508 is between the first object 500a and the second object 502a.

In examples such as this, an energy level of the energy source may be adjusted from the first energy level to the second energy level during supply of the third plurality of layers 508 to the build chamber, without supplying energy from the energy source to the build chamber. For example, the third plurality of layers 508 may be unfused layers of build material, which are not used for the formation of an object.

The third plurality of layers 508 of the build material may be supplied during a time period over which the energy level (such as the irradiance) of the energy source adjusts to the second energy level. For example, it may not be possible to instantaneously change the energy level of the energy source from the first energy level to the second energy level. Instead, the energy level of the energy source may change gradually.

Figure 6:
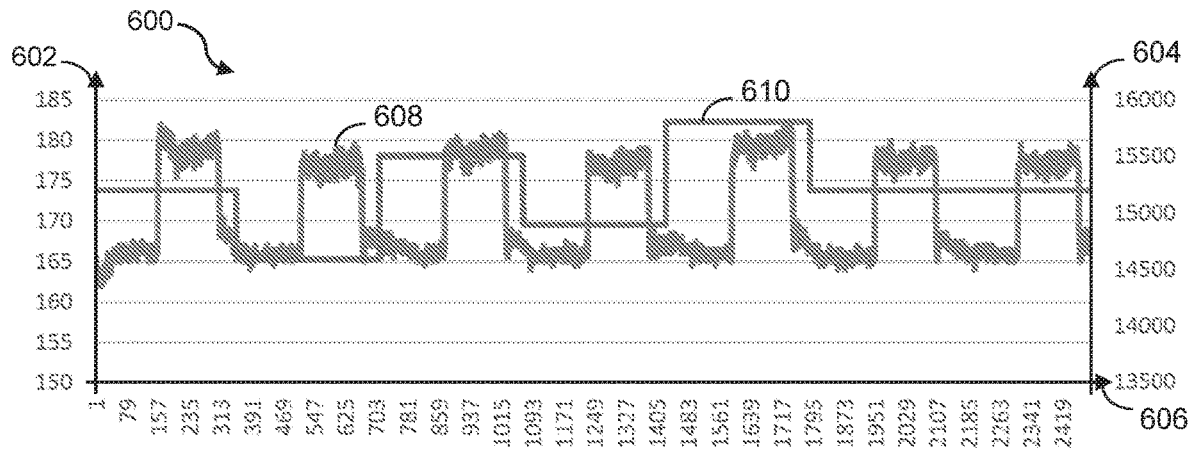
FIG. 6 is a graph illustrating the energy configuration of an energy source of an additive manufacturing system and the temperature of a series of objects being manufactured by the additive manufacturing system according to examples.

This may be seen in FIG. 6, which is a graph 600 illustrating the energy configuration of an energy source of an additive manufacturing system and the temperature of a series of objects being manufactured by the additive manufacturing system according to examples. The left-hand y-axis 602 of the graph 600 represents the temperature at the center of an object during printing (in Celsius), the right-hand y-axis 604 of the graph 600 represents the irradiance level in Watts per square centimeter of an energy source (which in this example is a fusing lamp) and the x-axis 606 of the graph 600 represents the number of layers of build material deposited.

The graph 600 illustrates two curves: a temperature curve 608 (which is shown with respect to the temperature axis 602) and an irradiance curve 610 (which is shown with respect to the irradiance level axis 604). The temperature curve 608 of FIG. 6 varies between a relatively high value of around 180 degrees Celsius and a relatively low value of around 165 Celsius. The layers of build material with a relatively low temperature value correspond to layers in which no object has been formed, and the layers of build material with a relatively high temperature value correspond to layers in which an object has been formed. Hence, FIG. 6 illustrates the formation of seven parts (each corresponding to one of the respective high portions of the temperature curve 608). Similarly, the irradiance curve 610 also varies between higher and lower values. Each of the different values of the irradiance curve 610 corresponds to a different respective energy level (or energy configuration) of the energy source. As can be seen, changes between different energy levels for the irradiance curve 610 are slightly out of synchronization with the formation of the objects. In general, the irradiance changes level a few layers after the formation of an object has finished, so that the additive manufacturing system can adapt to the new level of the irradiance (which is for example a new energy level of an energy source) while printing unfused layers, which do not correspond to an object. Finally, after the additive manufacturing system has had sufficient time to adapt to the change in the irradiance level, a new object is formed.

Figure 7:
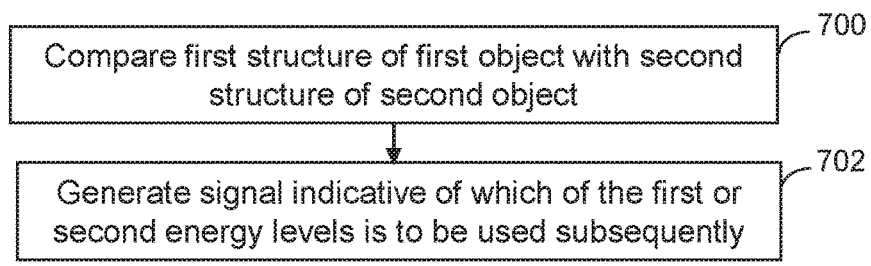
FIG. 7 is a flow diagram illustrating further features of a method of configuring an additive manufacturing system according to examples.

FIG. 7 is a flow diagram illustrating further features of a method of configuring an additive manufacturing system according to examples. FIG. 7 illustrates an example by which the signal indicative of which of the first or second energy levels is to be used for subsequent operation of the additive manufacturing system. Item 700 of FIG. 7 includes comparing a first structure of the first object with a second structure of the second object. At item 702 of FIG. 7, the signal is generated on the basis of the comparing of item 700. The comparison may be performed for example after cooling and cleaning each of the first and second objects, to remove excess unfused build material from an outer surface of the first and second objects.

The first and second structures may be compared in various different ways. For example, the first structure and the second structure may be compared visually, such as by an experienced operator of additive manufacturing systems, to assess the visibility of defects such as elephant skin or thermal bleed. The operator may then determine which of the first object or the second object is higher quality and may then select the first energy level or the second energy level corresponding to the higher quality object for subsequent operation of the additive manufacturing system.

In other examples, the user may select which of the first or second energy levels to use subsequently based on other characteristics of the first and second structures, depending on the needs of the user. For example, a user may desire an object that is dimensionally accurate and may therefore select whichever of the first or second energy levels produces a corresponding object that has the lowest dimensional error. In such cases, a comparison between the first and second structures may include a comparing each of the first and second structures to a desired or intended structure of the first and second object, respectively, such as a desired or intended thickness of a corresponding part of the first and second object.

As will be appreciated, a comparison between the first and second structures may be performed using an automated, computer-operated or computer-aided process, rather than purely by visual inspection.

To aid the determination of which of the first or second energy levels is to be used for subsequent operation of the additive manufacturing system, the first and second object may be different versions of the same object, with substantially the same configuration. For example, the configuration or physical structure of the first and second object may be the same except for minor variations due to the difference in the first and second energy levels during the formation of the first and second objects, respectively. For example, the first object may have some patches of elephant skin which is absent on the second object. FIG. 5 shows an example such as this. To form the first and second objects 500a, 502a in examples such as FIG. 5, configuration methods such as those described herein may include supplying the energy of the first energy level from the energy source in dependence on a shape of a predetermined object to form the first object as a first version of the predetermined object. The energy of the second energy level may also be supplied from the energy source in dependence on the shape of the predetermined object to form the second object as a second version of the predetermined object. The predetermined object may be a target object to be printed as part of the configuration process. The shape or structure of the predetermined object may depend on the intended use of the additive manufacturing system. For example, the shape of the predetermined object may be selected to be representative or similar to an anticipated or expected shape of forthcoming objects to be manufactured by the additive manufacturing system. In the example of FIG. 5, the predetermined object is in the shape of a cog. Hence, the additive manufacturing system to generate the first and second objects 500a, 502a of FIG. 5 may be intended to produce, in future operation, further objects with a similar shape, such as further cogs of a similar shape and size to the first and second objects 500a, 502a, As explained above, this is because, for a given energy level of the energy source, objects with different shapes or sizes may have varying quality. It is therefore desirable to configure the additive manufacturing system by forming objects, during the configuration process, which are representative of future parts to be printed.

Figure 8:
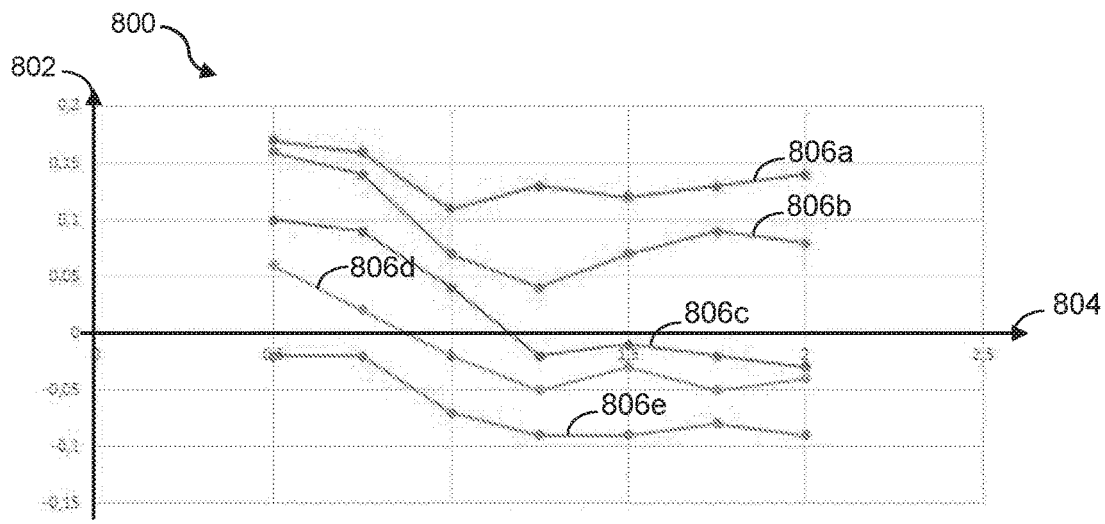
FIG. 8 is a graph illustrating the variation in wall thickness of walls of objects formed by an additive manufacturing system in dependence on a variation in the energy supplied by an energy source of the additive manufacturing system during formation of the objects.

In examples in which the first and second objects are first and second version of the predetermined part, the signal indicative of which of the first or second energy levels is to be used subsequently may be generated based on comparing a first difference between a reference thickness of a part of the predetermined object and a first thickness of a corresponding part of the first version of the predetermined object and a second difference between the reference thickness of the part of the predetermined object and a second thickness of a corresponding part of the second version of the predetermined object. FIG. 8 shows such an example.

FIG. 8 is graph 800 illustrating the variation in wall thickness of walls of objects formed by an additive manufacturing system in dependence on a variation in the energy supplied by an energy source of the additive manufacturing system during formation of the objects. The graph 800 of FIG. 8 may be referred to as an energy tuning plot. The x-axis 802 represents the deviation in millimeters (mm) from the reference thickness and the y-axis 804 represents the wall thickness of walls of an object, in mm. In this example, an object includes seven different walls with wall thicknesses of 0.5 mm, 0.75 mm, 1 mm, 1.25 mm, 1.5 mm, 1.75 mm and 2 mm. Five different versions of the object are formed, with five different energy levels of an energy source. Hence, the graph 800 shows five separate curves 806a, 806b, 806c, 806d, 806e, each corresponding to a different respective version of the object. The first version of the object (corresponding to the first curve 806a) is printed with an irradiance which is 4% higher than a nominal or reference irradiance, the second version of the object (corresponding to the second curve 806b) is printed with an irradiance which is 2% higher than the nominal irradiance, the third version of the object (corresponding to the third curve 806c) is printed with the nominal irradiance, the fourth version of the object (corresponding to the fourth curve 806d) is printed with an irradiance which is 2% lower than the nominal irradiance and the fifth version of the object (corresponding to the fifth curve 806e) is printed with an irradiance which is 4% lower than the nominal irradiance.

As can be seen from FIG. 8, the deviation in wall thickness varies depending on the irradiance of the energy source but also on the wall thickness itself. For example, for a wall thickness of 1 mm, the smallest deviation is for the fourth curve 806d, with an irradiance which is 2% lower than the nominal irradiance. However, for a wall thickness of 1.5 mm, the smallest deviation is for the third curve 806c, with the nominal irradiance.

FIG. 8 therefore illustrates that the appropriate energy level or energy configuration may depend on the structure of an object to be printed, such as the thickness of walls of the object. For example, if the object to be printed subsequently by the additive manufacturing system has a wall thickness of around 1 mm, the energy source may be configured with an irradiance which is 2% lower than the nominal irradiance, to reduce a deviation between the wall thickness of the object as printed, and the reference wall thickness. In contrast, if a subsequent object to be printed has a wall thickness of around 1.5 mm, the energy source may instead be configured with the nominal irradiance.

Figure 9:
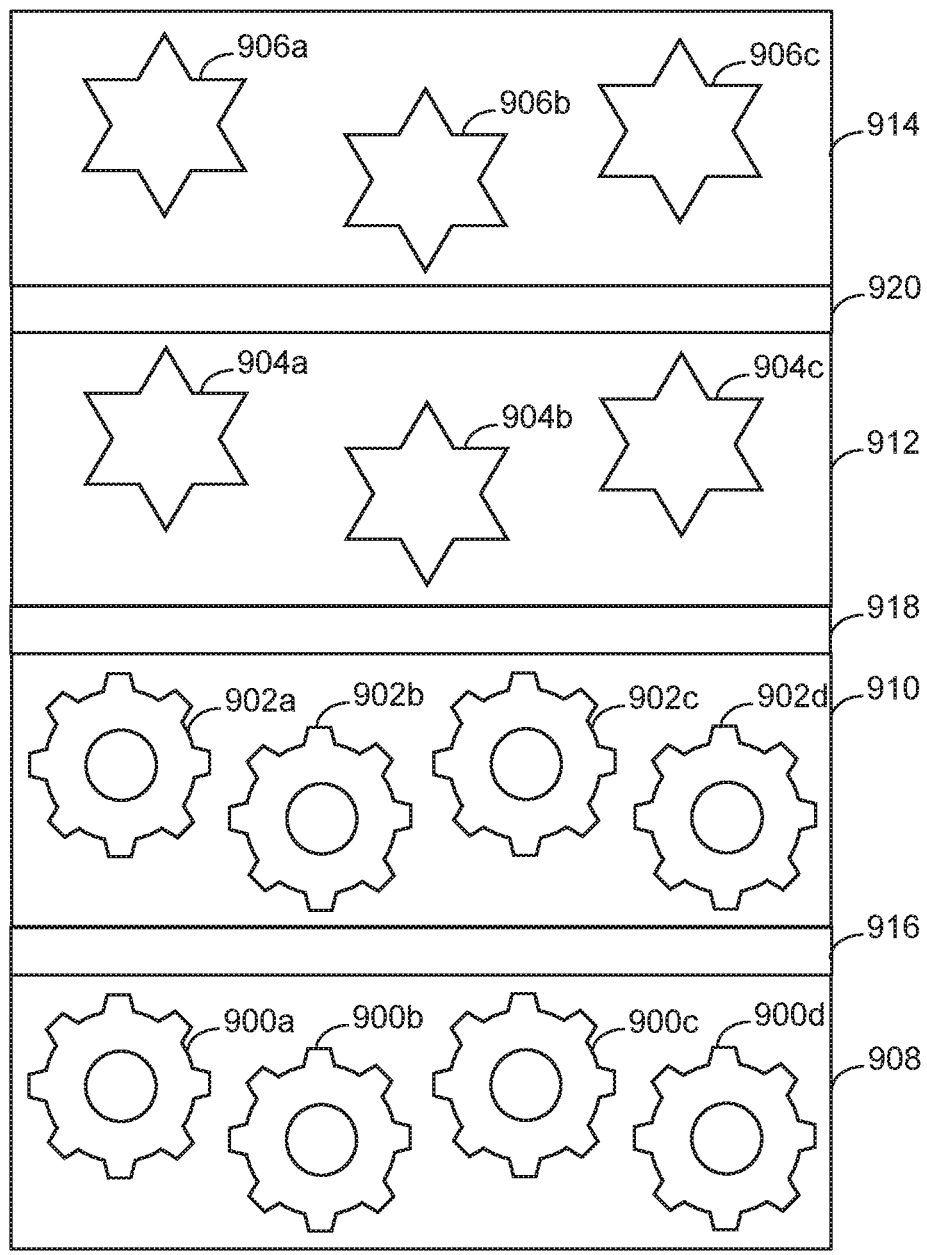
FIG. 9 shows schematically the formation of a first, second, third and fourth object accordingly examples.

A graph similar to the graph 800 of FIG. 8 may be obtained by printing a plurality of different versions of an object, each with a plurality of different energy configurations of the energy source, in order to determine an appropriate energy configuration for the printing of different objects, each with different characteristics. For example, one of the objects may be small, another may be large, a yet further object may be solid and a still further object may be predominantly hollow. FIG. 9 shows an example such as this, in which a first object 900a, a second object 902a, a third object 904a and a fourth object 906a are formed. The first object 900a is formed within a first build volume 908, the second object 902a is formed within a second build volume 910, the third object 904a is formed within a third build volume 912 and the fourth object 906a is formed within a fourth build volume 914, There are a plurality of layers 916, 918, 920 between each of the build volumes 908, 910, 912, 914. Similarly to FIG. 5, the first, second, third and fourth build volumes 908, 910, 912, 914 each include objects other than the first, second, third and fourth objects 900a, 902a, 904a, 906a (objects 900b, 900c, 900d in the first build volume 908, objects 902b, 902c, 902d in the second build volume 910, objects 904b, 904c in the third build volume 912 and objects 906b, 906c in the fourth build volume 914).

In FIG. 9, the first object 900a is a first version of a first predetermined object with a first shape and the second object 902a is a second version of the first predetermined object. In this example, the first predetermined object is a cog. The first and second versions of the first predetermined object are formed as described with reference to FIG. 5, In other words, the first version of the first predetermined object is formed by selectively solidifying at least a portion of the first plurality of layers of the build material using energy of a first energy level supplied from the energy source, and the second version of the first predetermined object is formed by selectively solidifying at least a portion of the second plurality of layers of the build material using energy of a second energy level supplied from the energy source. The plurality of layers of the build material 916 between the first build volume 908 and the second build volume 910 (and hence between the first object 900a and the second object 902a) may be considered to correspond to the third plurality of layers described above with reference to FIG. 5.

To form the structure illustrate in FIG. 9, the method may further include selectively solidifying at least a portion of a fourth plurality of layers of the build material using energy of a third energy level supplied from the energy source in accordance with a second shape of a second predetermined object, to form a first version of the second predetermined object (which in FIG. 9 corresponds with the third object 904a). The second predetermined object in this example is a star, although this is merely an illustrative example.

Such methods may further include selectively solidifying at least a portion of a fifth plurality of layers of the build material using energy of a fourth energy level supplied from the energy source in accordance with the second shape of the second predetermined object, to form a second version of the second predetermined object (which in FIG. 9 corresponds with the fourth object 906a).

In FIG. 9, as explained above, a plurality of layers 918 is formed between the second and third objects 902a, 904 and a plurality of layers 920 is formed between the third and fourth objects 904a, 906a, each of which may be unfused layers of build material, which may be deposited during changing of the energy level of the energy source from the second level to the third level (from forming the second object 902a to forming the third object 904a) and during changing of the energy level of the energy source from the third level to the fourth level (from forming the third object 904a to forming the fourth object 906a), respectively.

In examples such as FIG. 9, the first energy level may be substantially the same as the third energy level and the second energy level may be substantially the same as the fourth energy level. Two energy levels may be considered substantially the same where they are the same or relatively similar, such as within 5% or 10% of each other.

The configuration process in examples such as FIG. 9 allows two different energy configurations for the energy source for the formation of two different predetermined objects to be determined. For example, in cases such as this, a first signal indicative of which of the first energy level or the second energy level is to be used for a first mode of subsequent operation of the additive manufacturing system (for example based on analysis of the first and second objects 900a, 902a) and a second signal indicative of which of the third energy level or the fourth energy level is to be used for a second mode of subsequent operation of the additive manufacturing system (for example based on analysis of the third and fourth objects 904a, 906a) may each be received. The first mode may be for the generation of at least one further object with a substantially similar shape to the first shape and the second mode may be for the generation of at least one further object with a substantially similar shape to the second shape. Two objects may be considered to be substantially similar in shape where they are the same in shape or broadly similar in shape, such as the same shape within manufacturing tolerances or with a difference in size of up to 10% of each other.

Figure 10:
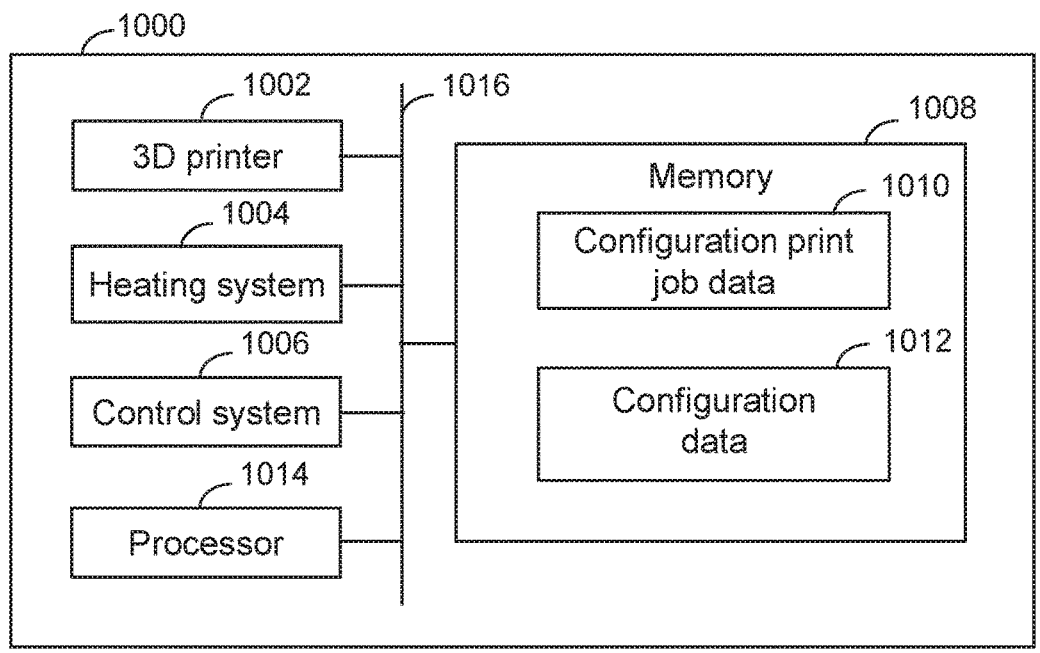
FIG. 10 is a schematic block diagram of a three-dimensional (3D) printing system according to examples.

FIG. 10 illustrates schematically a three-dimensional (3D) printing system 1000. The 3D printing system 1000 of FIG. 10 is similar to the additive manufacturing systems 100, 200 of FIGS. 1 and 2 but with additional components illustrated. The 3D printing system 1000 of FIG. 10 includes a 3D printer 1002 and a heating system 1004, which is an example of an energy source.

The example 3D printing system 1000 of FIG. 10 also includes a control system 1006. The control system 1006 may be arranged to control the 3D printing system 1000 in accordance with any of the examples described herein. For example, the control system 1006 may be arranged to receive configuration print job data representative of a configuration print job in which the heating system is to be configured with a first value of a heat setting and, subsequently, a second value of the heat setting. The heat setting for example represents a thermal irradiance supplied by the heating system 1004 to a build region of the 3D printer system 1000, such as a thermal irradiance of a heat source of the heating system 1004. The control system 1006 may be arranged control the 3D printer 1002 to print the configuration print job by configuring the heating system with the first value of the heat setting and, with the heating system configured with the first value of the heat setting, controlling the 3D printer 1002 to form, in a build region (such as the build chamber described above), a first object comprising a first plurality of layers of a build material, for example using the method of FIG. 3. For example, the control system 1006 may be arranged to control the 3D printer 1002 to iteratively supply a layer of the first plurality of layers to the build region and selectively solidify at least a portion of the layer of the first plurality of layers using thermal energy supplied from the heating system 1004. The configuration print job may further include configuring the heating system with the second value of the heat setting, for example subsequently to configuring the heating system with the first value of the heat setting, and, with the heating system configured with the second value of the heat setting, controlling the 3D printer 1002 to form, in the build region, a second object comprising a second plurality of layers of a build material, for example using a similar method to that used for the formation of the first object. The control system 1006 may further receive configuration data indicative of which of the first value or the second value of the heat setting is to be used for subsequent operation of the 3D printer 1002.

The control system 1006 may receive data from a memory 1008. The memory 1008 may include at least one of volatile memory, such as a random access memory (RAM) and non-volatile memory, such as read-only memory (ROM) or a solid state drive (SSD) such as Flash memory. The memory 1008 in examples may include further storage devices, for example magnetic, optical or tape media, compact disc (CD), digital versatile disc (DVD) or other data storage media. The memory 1008 may be removable or non-removable from the 3D printing system 1000. The 3D printer 1002 may include the memory 1008.

In the example of FIG. 10, the memory 1008 includes configuration print job data 1010 and configuration data 1012, described above. The control system 1006 may use the data of the memory 1008 to control the operation of the 3D printing system 1000, for example to implement configuration processes such as those described herein.

In the example of FIG. 10, the 3D printing system 1000 further includes a processor 1014, which is communicatively coupled to the memory 1008. The processor 1014 in FIG. 10 may be a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The components of the 3D printing system 1000 in the example of FIG. 10 are interconnected using a systems bus 1016. This allows data to be transferred between the various components.

Figure 11:
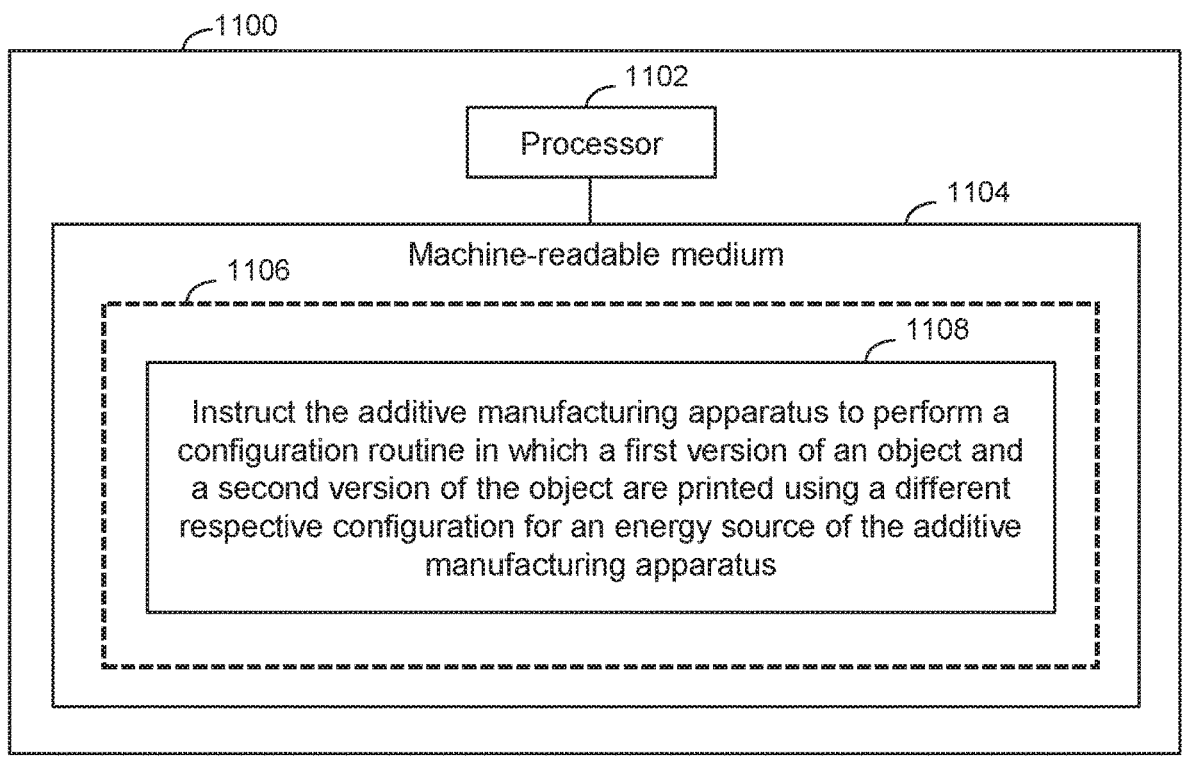
FIG. 11 shows schematically a computer-readable storage medium according to examples.

Certain system components and methods described herein may be implemented by way of machine-readable instructions that are storable on a non-transitory storage medium. FIG. 11 shows an example of an additive manufacturing apparatus 1100 including at least one processor 1102 arranged to retrieve data from a machine-readable medium 1104, which may be referred to as a computer-readable storage medium. The machine-readable medium 1104 includes a set of computer-readable instructions 1106 stored thereon. The at least one processor 1102 is configured to load the instructions 1106 into memory for processing. The instructions 1106 are arranged to cause the at least one processor 1102 to perform a series of actions.

Instruction 1108 is configured to cause the processor 1102 to instruct the additive manufacturing apparatus 1100 to perform a configuration routine, such as the configuration processes described herein. The configuration routine may involve printing a first version of an object and a second version of the object using a different respective energy configuration for an energy source of the additive manufacturing apparatus 1100. For example, the configuration routine may include depositing a first portion of a build material within a build chamber, selectively fusing at least part of the first portion of the build material using the energy source configured with a first energy configuration, to form the first version of the object. A second portion of the build material may be deposited within the build chamber and at least part of the second portion of the build material may be fused using the energy source configured with a second energy configuration, to form the second version of the object. A signal indicative of which of the first energy configuration or the second energy configuration is to be used for subsequent operation of the energy source may then be received. For example, the first energy configuration may correspond to a first energy level of an energy source, such as a first irradiance, or a first value of a heat setting of an energy source (in examples in which the energy source is a thermal energy source such as a heat source).

The non-transitory machine-readable medium 1108 can be any medium that can contain, store, or maintain programs and data for use by or in connection with an instruction execution system. Machine-readable media can include any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

The preceding description has been presented to illustrate and describe examples of the principles described. This description is not intended to be exhaustive or to limit these principles to any precise form disclosed. Many modifications and variations are possible in light of the above teaching. For example, although examples described above involve applying one or more printing agent to a layer of build material and selectively fusing at least a portion of the layer of the build material according to the pattern of the one or more printing agent, other examples are envisaged. For example, the methods described herein may be applied in other additive manufacturing systems or processes than those described herein, such as other additive manufacturing systems involving the selective application of energy, such as thermal energy, to form objects. For example, the methods described herein may be used with selective laser sintering systems, in which a laser may be used to selectively solidify portions of a build material without application of a printing agent.

Further examples are envisaged. In the above-described examples, an energy configuration, energy level or heat setting of an energy source (such as a heating system) are adjusted during a configuration process. However, in other examples, a different operation parameter of an additive manufacturing system may be adjusted as part of the configuration process.

Figure 12:
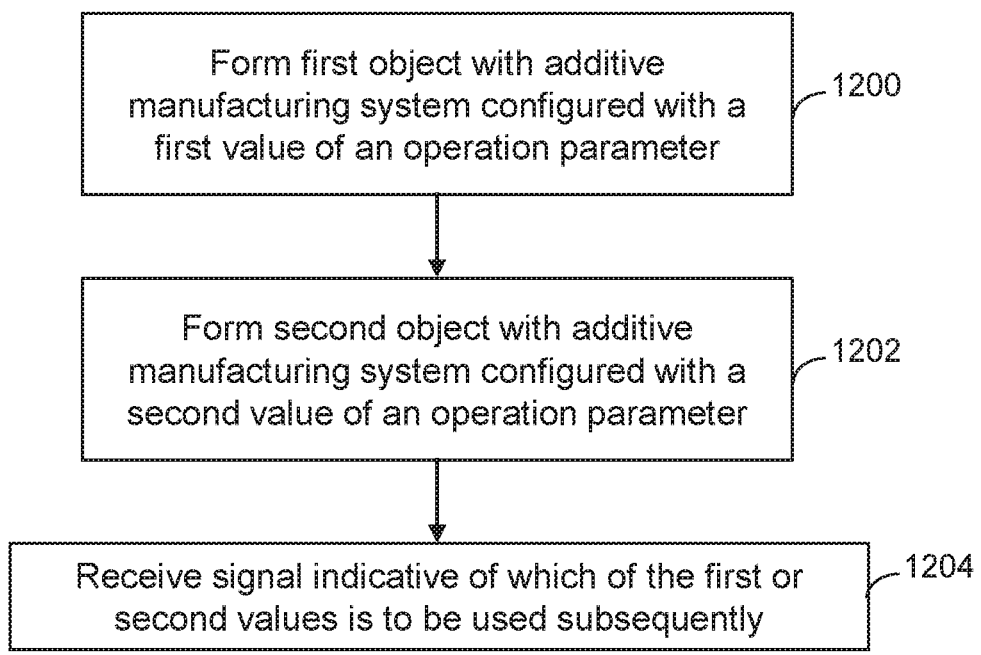
FIG. 12 is a flow diagram illustrating features of a method of configuring an additive manufacturing system according to yet further examples.

FIG. 12 is a flow diagram illustrating schematically an example of configuring an additive manufacturing system involving forming a first object and a second object with two different values of an operation parameter of an operation parameter. It is to be appreciated that methods such as that of FIG. 12 may be otherwise the same as or similar to the other examples described above, with the exception that the value of the operation parameter is altered between printing of various different objects rather than altering an energy configuration or energy level of an energy source of the additive manufacturing system, Indeed, an energy configuration or energy level of an energy source may be considered to be an example of an operation parameter.

The method of FIG. 12 includes, at item 1200, forming a first object with the additive manufacturing system configured with a first value of an operation parameter. An operation parameter is for example any variable or component of the additive manufacturing system that may be altered to alter a structure of an object formed by the additive manufacturing system. Such variables may therefore be adjusted to obtain a desired quality of an object printed by the additive manufacturing system. Examples of operation parameters include a density of one or more printing agents to be applied to a layer of build material or a laser power of a laser to be applied to a layer of build material to selectively fuse the layer of build material (for example in a selective laser sintering additive manufacturing system). The first object may be formed of a first plurality of layers of a build material and may be formed as explained above, for example by iteratively supplying layers of the first plurality of layers and selectively solidifying each layer in turn (for example by applying at least one printing agent to contact each layer and then applying thermal energy to the layer).

At item 1202 of FIG. 12, a second object is formed with the additive manufacturing system configured with a second value of the operation parameter, where the second value is different from the first value for example. For example, where the operation parameter is a density of a printing agent, the forming of the first object at item 1200 may involve depositing a first density, depth or composition of the printing agent per layer of the first plurality of layers, and the forming of the second object at item 1202 may involve depositing a second density, depth or composition of the printing agent per layer of the second plurality of layers.

As explained above with reference to other examples, the first and second objects may be formed as part of the same build process. The method of FIG. 12 may further include depositing a third plurality of layers between the first and second objects, for example while the operation parameter is adjusted from the first value to the second value. As for the other examples above, the method of FIG. 12 may also include forming additional objects within the same build process, such as at least one further object with a different shape to the shape of the first and second objects. Alternatively, the first and second objects may be different versions of the same object and the method of FIG. 12 may further include forming at least one version of a different object.

At item 1204, a signal is received which is indicative of which of the first value or the second value the operation parameter is to be configured with for subsequent operation of the additive manufacturing system. The signal may be similar to that described above, except that it represents one of the first value or the second value of the operation parameter rather than, for example, a first energy level or a second energy level.

It is to be appreciated that methods and systems in accordance with FIG. 12 may be used with a variety of different additive manufacturing systems, including those that involve the selective application of energy or the selective application of chemical binders. For example, methods and systems in accordance with FIG. 12 may be used in Binder Jetting or metal type 3D printing. In such cases, the operation parameter may be a density of a chemical binder to be applied to a build material, for example.

It is to be understood that any feature described in relation to any one example may be used alone, or in combination with other features described, and may also be used in combination with any features of any other of the examples, or any combination of any other of the examples.

What is claimed is:

1. A method comprising:
adjusting an energy source of an additive manufacture system to a first energy level;
after the energy source has been adjusted to the first energy level, using the additive manufacturing system to form a first object in a build chamber of the additive manufacturing system, by repeatedly applying first layers of build material and fusing the first layers by supplying energy from energy source at the first energy level, the first layers forming the first object;
adjusting the energy source to a second energy level different than the first energy level; and
after the energy source has been adjusted to the second energy level, using the additive manufacturing system to form a second object in the build chamber, by repeatedly applying second layers of build material on top of the first object and fusing the second layers by supplying energy from the energy source at the second energy level, the second layers forming the second object.

2. The method according to claim 1, wherein the first object and the second object are identical but for the first layers being fused with energy at the first energy level and the second object being fused with energy at the second energy level, the method further comprising:
comparing the first object with the second object, yielding a comparison result; and
selecting an energy level as the first energy level or the second energy level, based on the comparison result.

3. The method according to claim 2, further comprising:
adjusting the energy source to the selected energy level; and
after the energy source has been adjusted to the selected energy level, using the additive manufacturing system to form an additional object in the build chamber of the additive manufacturing system, by repeatedly applying additional layers of build material and fusing the additional layers by supplying energy from the energy source at the selected energy level, the additional layers forming the additional object.

4. The method according to claim 3, further comprising:
removing the first object and the second object from the build chamber prior to comparing the first object with the second object and prior to formation of the additional object.

5. The method according to claim 1, further comprising:
using the additive manufacturing system to repeatedly apply third layers of build material on top of the first object without supplying energy from the energy source, such that the third layers are unfused.

6. The method according to claim 5, wherein the additive manufacturing system is used to repeatedly apply the third layers on top of the first object without supplying energy from the energy source while the energy source is being adjusted to the second energy level.

7. A non-transitory machine-readable medium storing instructions that when executed by a processor of an additive manufacturing system cause the processor to:
adjust an energy source of the additive manufacture system to a first energy level;
after the energy source has been adjusted to the first energy level, use the additive manufacturing system to form a first object in a build chamber of the additive manufacturing system, by repeatedly applying first layers of build material and fusing the first layers by supplying energy from energy source at the first energy level, the first layers forming the first object;
adjust the energy source to a second energy level different than the first energy level; and
after the energy source has been adjusted to the second energy level, use the additive manufacturing system to form a second object in the build chamber, by repeatedly applying second layers of build material on top of the first object and fusing the second layers by supplying energy from the energy source at the second energy level, the second layers forming the second object.

8. The non-transitory machine-readable medium according to claim 7, wherein the first object and the second object are identical but for the first layers being fused with energy at the first energy level and the second object being fused with energy at the second energy level, the instructions when executed by the processor cause the processor to further:
compare the first object with the second object, yielding a comparison result; and
select an energy level as the first energy level or the second energy level, based on the comparison result.

9. The non-transitory machine-readable medium according to claim 8, wherein the instructions when executed by the processor cause the processor to further:
adjust the energy source to the selected energy level; and
after the energy source has been adjusted to the selected energy level, use the additive manufacturing system to form an additional object in the build chamber of the additive manufacturing system, by repeatedly applying additional layers of build material and fusing the additional layers by supplying energy from the energy source at the selected energy level, the additional layers forming the additional object.

10. The non-transitory machine-readable medium according to claim 9, wherein the first object and the second object are removed from the build chamber prior to comparing the first object with the second object and prior to formation of the additional object.

11. The non-transitory machine-readable medium according to claim 3, wherein the instructions when executed by the processor cause the processor to further:
use the additive manufacturing system to repeatedly apply third layers of build material on top of the first object without supplying energy from the energy source, such that the third layers are unfused.

12. The non-transitory machine-readable medium according to claim 11, wherein the additive manufacturing system is used to repeatedly apply the third layers on top of the first object without supplying energy from the energy source while the energy source is being adjusted to the second energy level.

13. An additive manufacturing system comprising:
an additive manufacturing printer having a build chamber;
an energy source;
a processor programmed to:
adjust the energy source to a first energy level;
after the energy source has been adjusted to the first energy level, use the additive manufacturing system to form a first object in the build chamber, by repeatedly applying first layers of build material using the additive manufacturing printer and fusing the first layers by supplying energy from energy source at the first energy level, the first layers forming the first object;
adjust the energy source to a second energy level different than the first energy level; and
after the energy source has been adjusted to the second energy level, use the additive manufacturing system to form a second object in the build chamber, by repeatedly applying second layers of build material on top of the first object using the additive manufacturing printer and fusing the second layers by supplying energy from the energy source at the second energy level, the second layers forming the second object.

14. The additive manufacturing system according to claim 13, wherein the first object and the second object are identical but for the first layers being fused with energy at the first energy level and the second object being fused with energy at the second energy level, the processor programmed to further:
compare the first object with the second object, yielding a comparison result; and
select an energy level as the first energy level or the second energy level, based on the comparison result.

15. The additive manufacturing system according to claim 14, wherein the processor is programmed to further:
adjust the energy source to the selected energy level; and
after the energy source has been adjusted to the selected energy level, use the additive manufacturing system to form an additional object in the build chamber of the additive manufacturing system, by repeatedly applying additional layers of build material using the additive manufacturing printer and fusing the additional layers by supplying energy from the energy source at the selected energy level, the additional layers forming the additional object.

16. The additive manufacturing system according to claim 15, wherein the first object and the second object are removed from the build chamber prior to comparing the first object with the second object and prior to formation of the additional object.

17. The additive manufacturing system according to claim 13, wherein the processor is programmed to further:
use the additive manufacturing system to repeatedly apply third layers of build material on top of the first object using the additive manufacturing printer without supplying energy from the energy source, such that the third layers are unfused.

18. The additive manufacturing system according to claim 17, wherein the additive manufacturing system is used to repeatedly apply the third layers on top of the first object using the additive manufacturing printer without supplying energy from the energy source while the energy source is being adjusted to the second energy level.

* * * * *